US012118708B2

(12) United States Patent
Kang et al.

(10) Patent No.: US 12,118,708 B2
(45) Date of Patent: Oct. 15, 2024

(54) DEVICE AND METHOD FOR DETECTING DEFECTS ON WAFER

(71) Applicant: Samsung Electronics Co., Ltd., Suwon-si (KR)

(72) Inventors: Min-Cheol Kang, Hwaseong-si (KR); Do-Nyun Kim, Seoul (KR); Jaehoon Kim, Seoul (KR); Woojoo Sim, Hwaseong-si (KR)

(73) Assignees: Samsung Electronics Co., Ltd., Gyeonggi-do (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 471 days.

(21) Appl. No.: 17/465,179

(22) Filed: Sep. 2, 2021

(65) Prior Publication Data

US 2022/0108436 A1 Apr. 7, 2022

(30) Foreign Application Priority Data

Oct. 5, 2020 (KR) .................. 10-2020-0128348

(51) Int. Cl.
*G06T 7/00* (2017.01)
*G06N 3/045* (2023.01)

(52) U.S. Cl.
CPC .............. *G06T 7/0006* (2013.01); *G06T 7/97* (2017.01); *G06T 2207/10061* (2013.01); *G06T 2207/20081* (2013.01); *G06T 2207/20221* (2013.01); *G06T 2207/30148* (2013.01)

(58) Field of Classification Search
CPC ..................... G06T 7/0006; G06T 7/97; G06T 2207/10061; G06T 2207/20081; G06T 2207/20221; G06T 2207/30148; G06T 2207/10024; G06T 2207/20076; G06T 2207/20084; G06T 7/10; G06T 7/0008;
(Continued)

(56) References Cited

U.S. PATENT DOCUMENTS

| 8,526,710 B2 | 9/2013 | Nakagaki et al. |
| 10,303,153 B2 | 5/2019 | Czerkas et al. |
| 10,395,362 B2 | 8/2019 | Gupta et al. |

(Continued)

OTHER PUBLICATIONS

M. Kang et al. 'Development of Hotspot Detection Process using Conditional Generative Adversarial Network' *OPC, Logic*, 2019.

*Primary Examiner* — Siamak Harandi
(74) *Attorney, Agent, or Firm* — Harness, Dickey & Pierce, P.L.C.

(57) ABSTRACT

Disclosed is a wafer defect inference system, which includes a test equipment that receives a first image obtained by imaging circuit patterns formed on a semiconductor wafer by using a scanning electron microscope and a second image obtained by imaging a layout image of a mask for implementing the circuit pattern on the semiconductor wafer and combines the first image and the second image to generate a combination image, and at least one computing device that is capable of communicating with the test equipment and infers a defect associated with the circuit pattern formed on the semiconductor wafer. The computing device receives the combination image, performs machine learning for inferring the defect based on the combination image, and generates an output image including information about the defect based on the machine learning.

19 Claims, 13 Drawing Sheets

(58) Field of Classification Search
CPC ... H01L 22/12; H01L 22/30; H01L 21/67288; G06N 3/045; G06N 20/00; G06V 10/993
See application file for complete search history.

(56) References Cited

U.S. PATENT DOCUMENTS

| | | |
|---|---|---|
| 2018/0330511 A1 | 11/2018 | Ha et al. |
| 2019/0004504 A1 | 1/2019 | Yati |
| 2019/0147127 A1 | 5/2019 | Su et al. |
| 2019/0287238 A1 | 9/2019 | Sriraman |
| 2019/0318471 A1 | 10/2019 | Chen et al. |
| 2020/0105500 A1* | 4/2020 | Chou ................... H01J 37/261 |
| 2021/0026338 A1* | 1/2021 | Yati ....................... G06T 7/0006 |
| 2021/0133989 A1* | 5/2021 | Bhattacharyya ....... G06V 10/82 |
| 2021/0209418 A1* | 7/2021 | Badanes ............. G06F 18/2155 |
| 2021/0279520 A1* | 9/2021 | Ivanov ............... G06V 10/7796 |
| 2021/0334946 A1* | 10/2021 | Buzaglo ............. G01N 21/9501 |
| 2021/0364450 A1* | 11/2021 | Lauber ...................... G06T 5/50 |
| 2022/0375063 A1* | 11/2022 | Pisarenco ............... G03F 7/705 |

* cited by examiner

DEVICE AND METHOD FOR DETECTING DEFECTS ON WAFER

CROSS-REFERENCE TO RELATED APPLICATIONS

This application claims priority under 35 U.S.C. § 119 to Korean Patent Application No. 10-2020-0128348 filed on Oct. 5, 2020, in the Korean Intellectual Property Office, the disclosures of which are incorporated by reference herein in their entireties.

BACKGROUND

Example embodiments of the present disclosure described herein relate to a semiconductor process technology, and more particularly, relate to a system and a method for inferring a defect on a wafer based on machine learning.

During lithography, which is a technology for applying circuit patterns onto wafers, circuit patterns are formed on a surface of the wafer by a process including applying photo resist (PR) onto the wafer on which an oxide film is deposited, and selectively emitting a light on the photo resist (e.g., through a mask containing the circuit patterns). With the development of the semiconductor process technology, the demand for higher degrees of integration of circuits has increase, but the pitch between the circuit patterns has decreases. As such, circuit designs have also becomes more complicated.

Because a size of a light (e.g., the wavelength) used in the lithography may be large compared to the pitch between circuit patterns, a defect may occur on the wafer in an exposure step. The defect on the wafer may cause a fault of a semiconductor device manufactured by using the wafer. For this reason, the defect on the wafer may be perceived as a critical factor reducing the reliability and productivity of a semiconductor device. Accordingly, there is a great demand on a test process of high accuracy for inferring a wafer defect.

SUMMARY

Example embodiments of the present disclosure provide a system and a method for inferring a defect on a wafer based on machine learning without a separate module or detector.

According to an embodiment, a wafer defect inference system includes a test equipment that receives a first image obtained by imaging circuit patterns formed on a semiconductor wafer by using a scanning electron microscope and a second image obtained by imaging a layout image of a mask for implementing the circuit pattern on the semiconductor wafer and combines the first image and the second image to generate a combination image, and at least one computing device that is capable of communicating with the test equipment and infers a defect associated with the circuit pattern formed on the semiconductor wafer. The computing device receives the combination image, performs machine learning for inferring the defect based on the combination image, and generates an output image including information about the defect based on the machine learning.

According to an embodiment, an operating method of a device configured to infer a defect of circuit patterns formed on a semiconductor wafer includes combining a first image and a second image to generate a combination image, the first image including an imaging of the circuit pattern, and the second image including an imaging of a layout image of a mask for implementing the circuit pattern on the semiconductor wafer; generating, based on a machine learning operation of the device, an output image from the combination image, the output image including defect information about the defect from the combination image, and outputting the output image.

According to an embodiment, a non-transitory computer-readable medium storing a program code including an image generation model executable by a processor, the program code, when executed, causing the processor to combine a first image and a second image to generate a combination image, the first image including an imaging of a circuit pattern formed on a semiconductor wafer, and the second image including an imaging of a layout image of a mask for implementing the circuit pattern on the semiconductor wafer; and to generate, based on machine learning, an output image from the combination image, the output image including defect information of the circuit pattern.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
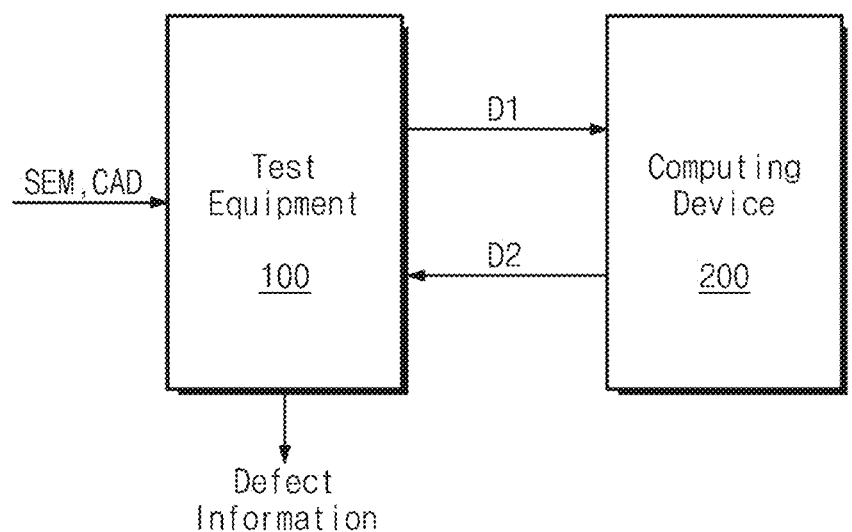
FIG. 1 is a block diagram illustrating a wafer defect inference system according to some embodiments.

Below, embodiments of the present disclosure may be described in detail and clearly to such an extent that an ordinary one in the art easily implements the present disclosure.

The terms used in the specification are provided to describe the embodiments, not to limit the present disclosure. As used in the specification, the singular terms "a,"

"an" and "the" are intended to include the plural forms as well, unless the context clearly indicates otherwise. The terms "comprises" and/or "comprising," when used in the specification, specify the presence of steps, operations, elements, and/or components, but do not preclude the presence or addition of one or more other steps, operations, elements, components, and/or groups thereof.

Unless otherwise defined, all terms (including technical and scientific terms) used in the specification should have the same meaning as commonly understood by those skilled in the art to which the present disclosure pertains. The terms, such as those defined in commonly used dictionaries, should not be interpreted in an idealized or overly formal sense unless expressly so defined herein. The same reference numerals represent the same elements throughout the specification.

FIG. 1 is a block diagram illustrating a wafer defect inference system 10 according to some embodiments. The wafer defect inference system 10 may also be referred to as a "wafer monitoring system," a "wafer test system," a "semiconductor manufacturing process monitoring system," and/or a "semiconductor manufacturing system." The wafer defect inference system 10 may infer a defect in circuit patterns implemented on a wafer. Referring to FIG. 1, the wafer defect inference system 10 includes test equipment 100 and a computing device 200. Below, the description will be given with the computing device 200 described as a separate component (e.g., independent of the test equipment 100). However, this is an example embodiment, and the example embodiments should not be limited thereto. For example, the computing device 200 may be implemented in the form of being embedded in the test equipment 100.

The test equipment 100 may detect a defect of circuit patterns on the wafer and may output defect information of the wafer (and/or information about a wafer defect). Information about the wafer (and/or wafer defect) may include, for example, at least one of a location of a defect, a size of the defect, a shape of the defect, a color of the defect, a kind of the defect, and/or the like. In some example embodiments, the test equipment 100 may output the information about the wafer (and/or wafer defect) in the form of an image. The test equipment 100 may include a geometry verification system (e.g., nano geometry research (NGR) equipment), an image detecting system (e.g., an electron microscope such as a scanning electron microscope (SEM)), and/or the like.

The test equipment 100 may include and/or be connected to a user interface (not illustrated). The user interface may include a user input interface and a user output interface. For example, the user input interface may be configured to receive information from a user, and may include at least one of a keyboard, a mouse, a touch pad, a microphone, and/or the like. The user output interface may be configured to output information to the user and/or may include at least one of a monitor, a beam projector, a speaker, and/or the like. In some embodiment, when the wafer defect inference system 10 infers a defect associated with a circuit pattern, as described in further detail below, the wafer defect inference system 10 may output information about the defect to the user through the user output interface.

In some example embodiments, for example wherein the test equipment 100 does not include an image detecting system, the test equipment 100 may be supplied with an image for detecting a defect on a wafer. The image input to the test equipment 100 may be, for example, an SEM image and/or a computer aided design (CAD) image. The image may be referred to as a "wafer image" and, in some example embodiments, may be obtained by scanning circuit patterns formed on a wafer through a mask, by using a scanning electron microscope (SEM). The CAD image that is an image of a mask formed to implement circuit patterns on a wafer may include a layout image associated with a target pattern produced in and/or modified by a computer system. However, this is one example embodiment, and the example embodiments should not be limited thereto. For example, as noted above, in some embodiments, the test equipment 100 may include an image detecting system and/or processing circuitry such that at least one of the SEM image and/or the CAD image is produced by the test equipment 100.

The test equipment 100 may combine the input SEM image and CAD image to generate a combination image. The combination image may be, for example, generated by overlapping the SEM image and the CAD image around a pattern axis. Although not illustrated in FIG. 1, the test equipment 100 may include an align module. The align module may perform template matching around the pattern axis of the SEM image and the CAD image, as preprocessing for generating a combination image of the test equipment 100.

The computing device 200 may communicate with the test equipment 100. The computing device 200 may be referred to as an "electronic device" and/or an "image generating device." The computing device 200 may receive input data D1 from the test equipment 100. The input data D1 may include the combination image of the SEM image and the CAD image.

The computing device 200 may perform machine learning on information about a wafer (and/or wafer defect) based on deep learning. For example, the computing device 200 may perform learning on information about a wafer (and/or wafer defect) based on a generative adversarial network (hereinafter referred to as a "GAN"). Below, the description will be given as implemented based on the principle of the GAN, but this is an example embodiment, and the example embodiments should not be limited thereto. For example, in some embodiments, the machine learning may be based on any other network included in a GAN system. For example, the machine learning may be based on a conditional generative adversarial network (hereinafter referred to as a "CGAN"). Additionally, according to some embodiments, the machine learning may be based on an architecture of a deep neural network (DNN) and/or n-layer neural network. The DNN and/or n-layer neural network may correspond to a convolution neural network (CNN), recurrent neural network (RNN), deep belief network, restricted Boltzmann machine, or the like.

Alternatively and/or additionally, such artificial intelligence architecture systems may include other forms of machine learning models, such as, for example, linear and/or logistic regression, statistical clustering, Bayesian classification, decision trees, dimensionality reduction such as principal component analysis, and expert systems; and/or combinations thereof, including ensembles such as random forests. In some example embodiments, the artificial intelligence architecture systems may include a pooling layer (as described below in more detail), a fully connected layer, and/or the like in addition to a plurality of convolution layers.

The computing device 200 may also infer a defect on a wafer based on the learned defect information. The computing device 200 may transmit image data D2 including defect information of a wafer to the test equipment 100. The test equipment 100 may output the defect information of the wafer obtained from the computing device 200 to the outside and/or may use the defect information of the wafer in performing a test operation. The wafer defect inference system 10 may, in some embodiments, output the defect information of the wafer as an image. The defect information output from the wafer defect inference system 10 according to the present disclosure may include various types of defect information such as a location of a defect on a wafer, a size of the defect, a shape of the defect, a color of the defect, a kind of the defect, and/or the like.

In addition, the wafer defect inference system 10 according to some embodiments may include a neuromorphic processor, configured to perform machine learning based on the GAN for image conversion. Accordingly, the wafer defect inference system 10, according to some embodiments, may detect a new type of defect without data associated with all kinds of defects and may reduce false detection (e.g., false positives) and/or undetection (e.g., false negatives) of defects on a wafer.

Figure 2:
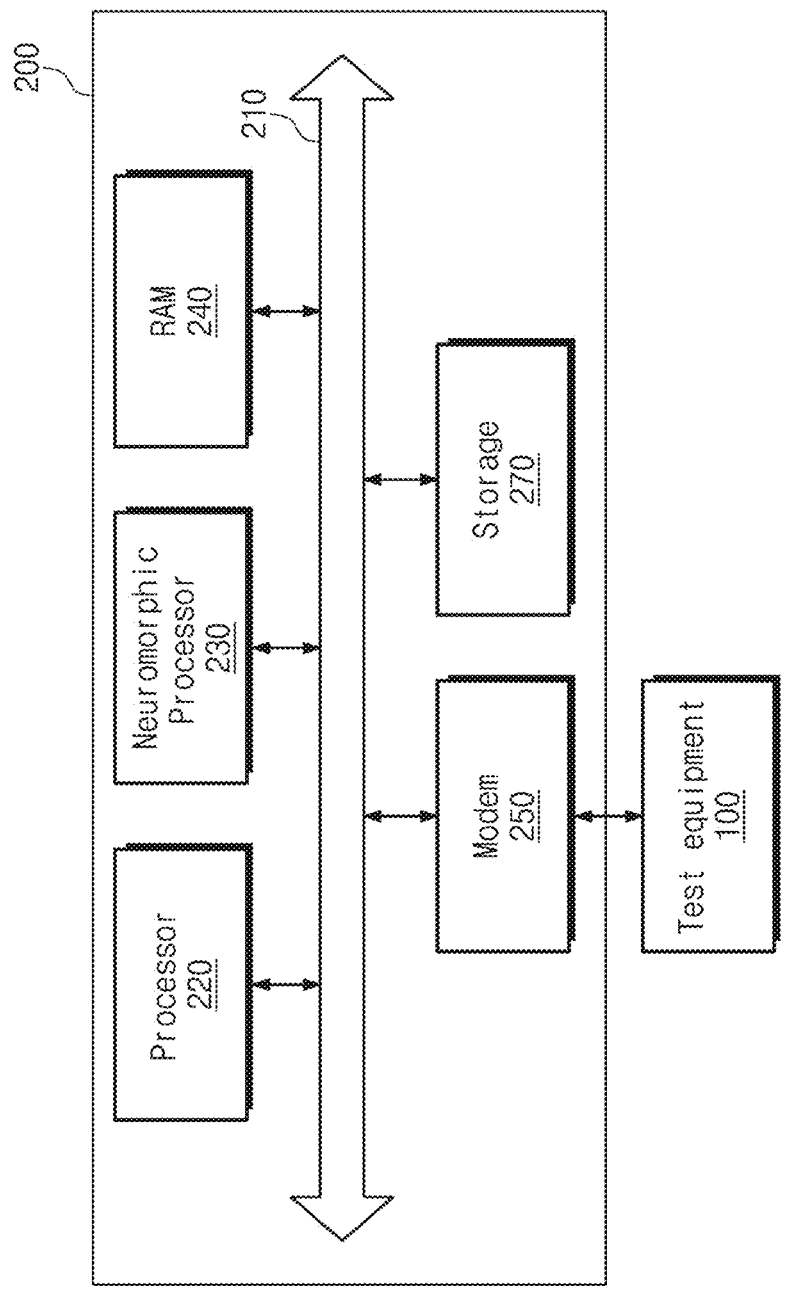
FIG. 2 is a block diagram illustrating a configuration of a computing device according to some embodiments.

FIG. 2 is a block diagram illustrating a configuration of the computing device 200 according to some embodiments. Referring to FIG. 2, the computing device 200 may include a bus 210, a processor 220, a neuromorphic processor 230, a random access memory (RAM) 240, a modem 250, and storage 270. The bus 210 may provide a communication channel between the components 220 to 250 and 270 included in the computing device 200.

The processor 220 may control the computing device 200. For example, the processor 220 may execute an operating system, firmware, and/or the like for driving the computing device 200. The processor 220 may instruct the neuromorphic processor 230 to perform machine learning and/or may support the machine learning of the neuromorphic processor 230. For example, the processor 220 may control and/or assist in the communication of the neuromorphic processor 230 with the RAM 240, the modem 250, or the storage 270 through the bus 210.

The neuromorphic processor 230 may perform the machine learning, for example, based on the instruction of the processor 220. The neuromorphic processor 230 may receive images from the test equipment 100 through the modem 250. The neuromorphic processor 230 may perform the machine learning based on the received images. Though the neuromorphic processor 230 is illustrated in FIG. 2 as a component independent of the processor 220, according to some embodiments, the neuromorphic processor 230 may be included in the processor 220, and the machine learning performed by the neuromorphic processor 230 may be performed by the processor 220.

The test equipment 100, the processor 220 and/or the neuromorphic processor 230 may include and/or be included in, for example, processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a hardware accelerator, and programmable logic unit, a microprocessor, application-specific integrated circuit (ASIC), etc.

The RAM 240 may function as a working memory of the processor 220 and/or the neuromorphic processor 230. The RAM 240 may include a volatile memory such as a static random access memory (SRAM), a dynamic random access memory (DRAM), a nonvolatile memory (such as a phase-change random access memory (PRAM), a magnetic random access memory (MRAM), a resistive random access memory (RRAM), and/or a ferroelectric random access memory (FRAM)), and/or the like.

The modem 250 may receive images from the test equipment 100 and may transfer the received images to the neuromorphic processor 230. Though the test equipment 100 is illustrated as connected with the computing device 200 through the modem 250, this is only an example embodiment, and in some embodiments, the test equipment 100 and the computing device 200 may be integrated. Also, although not illustrated in FIG. 2, the test equipment 100 may include an image database that stores images. The image database may store images associated with circuit patterns on a wafer and images including defect information of the wafer. For example, the image database may store combination images input to the computing device 200 and images indicating defect information obtained from the computing device 200. In some embodiments, the image database may include and/or be included in a computer-accessible medium (not shown) for example, a non-transitory memory system. The term "non-transitory," as used herein, is a limitation of the medium itself (e.g., as tangible, and not a signal) as opposed to a limitation on data storage persistency (e.g., RAM vs. ROM). The image database may be included in or separate from the storage 270 and/or the RAM 240.

The storage 270 may store data generated by the processor 220. The storage 270 may store codes of an operating system or firmware that the processor 220 executes. The storage 270 may include a nonvolatile memory such as a PRAM, an MRAM, an RRAM, an FRAM, and/or a NAND flash memory. Though illustrated as separate from the RAM 240, this is only an example embodiment. For example, in some example embodiments, the storage 270, the RAM 240, and/or the image database may include or be included in separate computer-accessible medium, include or be included in different regions of a shared computer-accessible medium, and/or share a computer-accessible medium. In some embodiments, the computer-accessible medium may also include instructions for the operation of the wafer defect inference system 10.

Figure 3:
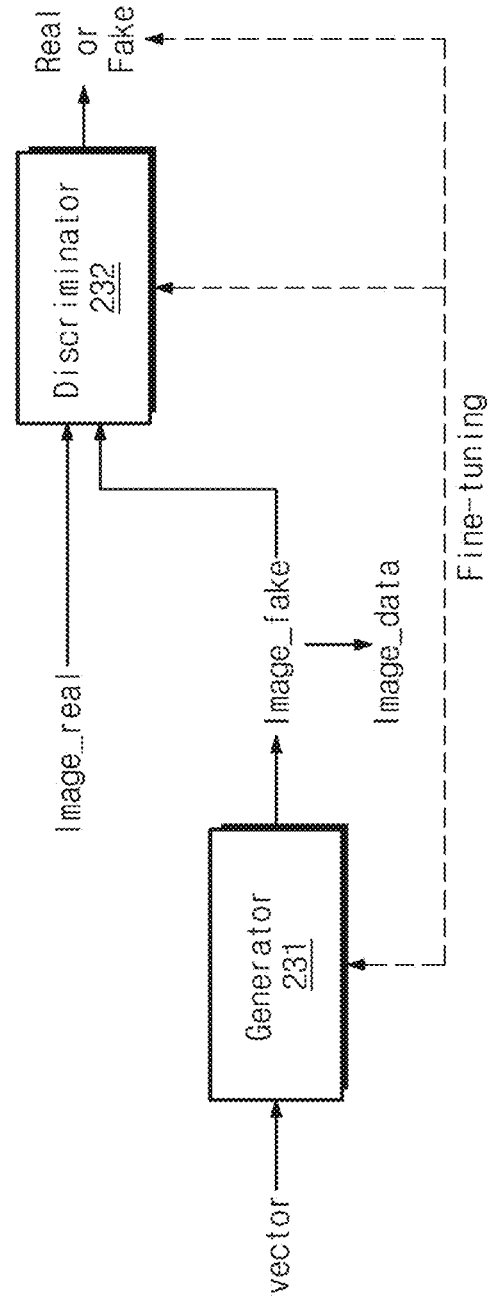
FIG. 3 is a diagram for describing how a neuromorphic processor according to some embodiments performs machine learning based on a GAN.

FIG. 3 is a diagram for describing how the neuromorphic processor 230 (refer to FIG. 2) according to some embodiments performs machine learning based on the GAN. The neuromorphic processor 230, according to some embodiments, may obtain information of a defect, which is capable of occurring on a wafer, through machine learning. For example, the neuromorphic processor 230 may use GAN-based machine learning to infer a defect. Referring to FIG. 3, a GAN-based image generation model that the neuromorphic processor 230 executes may include a generator network 231 and a discriminator network 232. The generator network 231 may be referred to as a "generator" and/or a "generation unit," and the discriminator network 232 may be referred to as a "discriminator" and/or a "discrimination unit."

The discriminator network 232 may receive a real combination image image_real and/or a fake combination image image_fake and may determine whether an input image (e.g., a received image) is real or fake. Herein, the real combination image image_real refers to an image that is input to the neuromorphic processor 230 and is obtained by combining an SEM image and a CAD image of a wafer targeted for defect detection; and fake combination image image_fake refers to a combination image that is generated by the generator network 231 based on an input vector.

The neuromorphic processor 230 may perform a first machine learning that allows the discriminator network 232 to determine the real combination image image_real as real and the fake combination image image_fake as fake. For example, the discriminator network 232 may perform at least one of the following operations on the input real combination image image_real and/or the input fake combination image image_fake: a convolution operation, a pooling operation, a down sampling operation, a multiplication operation, an addition operation, an activation operation, and/or the like. Through the above operations, the discriminator network 232 may output a signal indicating whether an input image is real or fake. The operations of the discriminator network 232 will be more fully described with reference to FIG. 6.

The neuromorphic processor 230 may update and/or tune weights and/or biases of nodes (not illustrated) included in the discriminator network 232. For example, the weights and/or biases may be updated and/or tuned in the case wherein the discriminator network 232 incorrectly determines the real combination image image_real as fake. Similarly, in the case where the discriminator network 232 determines the fake combination image image_fake as real, the neuromorphic processor 230 may update and/or tune the weights and/or biases of the nodes included in the discriminator network 232.

The neuromorphic processor 230 may also perform a second machine learning on the generator network 231 such that the fake combination image image_fake generated from the generator network 231 is determined as real by the discriminator network 232. In some embodiments, the second machine learning may be performed after a first machine learning is complete and/or in parallel to the first machine learning. The generator network 231 may perform at least one of the following operations on the input vector: a deconvolution operation, an unpooling operation, an up sampling operation, a multiplication operation, an addition operation, and/or an activation operation. Through the above operations, the generator network 231 may generate the fake combination image image_fake based on the input vector. The operations of the generator network 231 will be more fully described with reference to FIG. 7.

At the beginning of the second machine learning, in the case where the discriminator network 232 determines the fake combination image image_fake generated by the generator network 231 as fake, the neuromorphic processor 230 may update or tune weights or biases of nodes included in the generator network 231. When the second machine learning is completed, the discriminator network 232 may determine the fake combination image image_fake generated by the generator network 231 as real, may determine the fake combination image image_fake generated by the generator network 231 as real with the probability of about 50%, or may determine the fake combination image image_fake generated by the generator network 231 as fake with the probability of about 50%. For example, the discriminator network 232 may fail to accurately determine whether the fake combination image image_fake output from the generator network 231 is real or fake, and thus, the generator network 231 may cheat the discriminator network 232.

The fake combination image image_fake generated by the generator network 231 may be output from the computing device 200 (refer to FIG. 1) to the test equipment 100 (refer to FIG. 1) in the form of image data image_data. The image data image_data may include defect information of a wafer targeted for defect detection. The wafer defect information capable of being extracted may include various types of defect features such as a location of a defect, a size of the defect, a shape of the defect, a color of the defect, and a kind of the defect.

Figure 4:
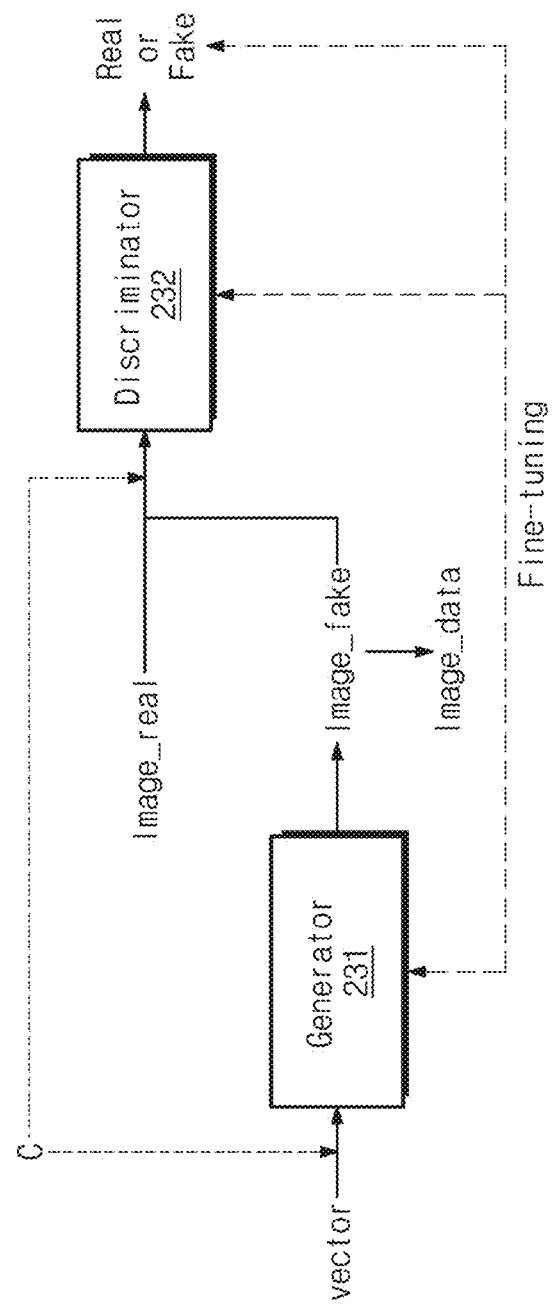
FIG. 4 is a diagram for describing how a neuromorphic processor according to some embodiments of the present disclosure performs machine learning based on a CGAN.

FIG. 4 is a diagram for describing how the neuromorphic processor 230 (refer to FIG. 2) according to some embodiments performs machine learning based on the CGAN. In some example embodiments, a CGAN-based machine learning may be similar to and/or the same as the GAN-based machine learning (for example, in terms of a driving principle), but may otherwise include a condition "C" applied to input data of the generator network 231 and the discriminator network 232. For example, in performing the CGAN-based machine learning, the generator network 231 may be provided with an input vector "Vector" and the condition "C," and the discriminator network 232 may be provided with the real combination image image_real and the condition "C." In some embodiments, the condition "C" may be auxiliary information such as and/or related to class labels and/or defect information of the real combination image image_real and/or the fake combination image image_fake. The machine learning, the image generating operation, and the image determining operation of each of the generator network 231 and the discriminator network 232 may be performed in a state where the condition "C" is applied to input data.

Figure 5A:
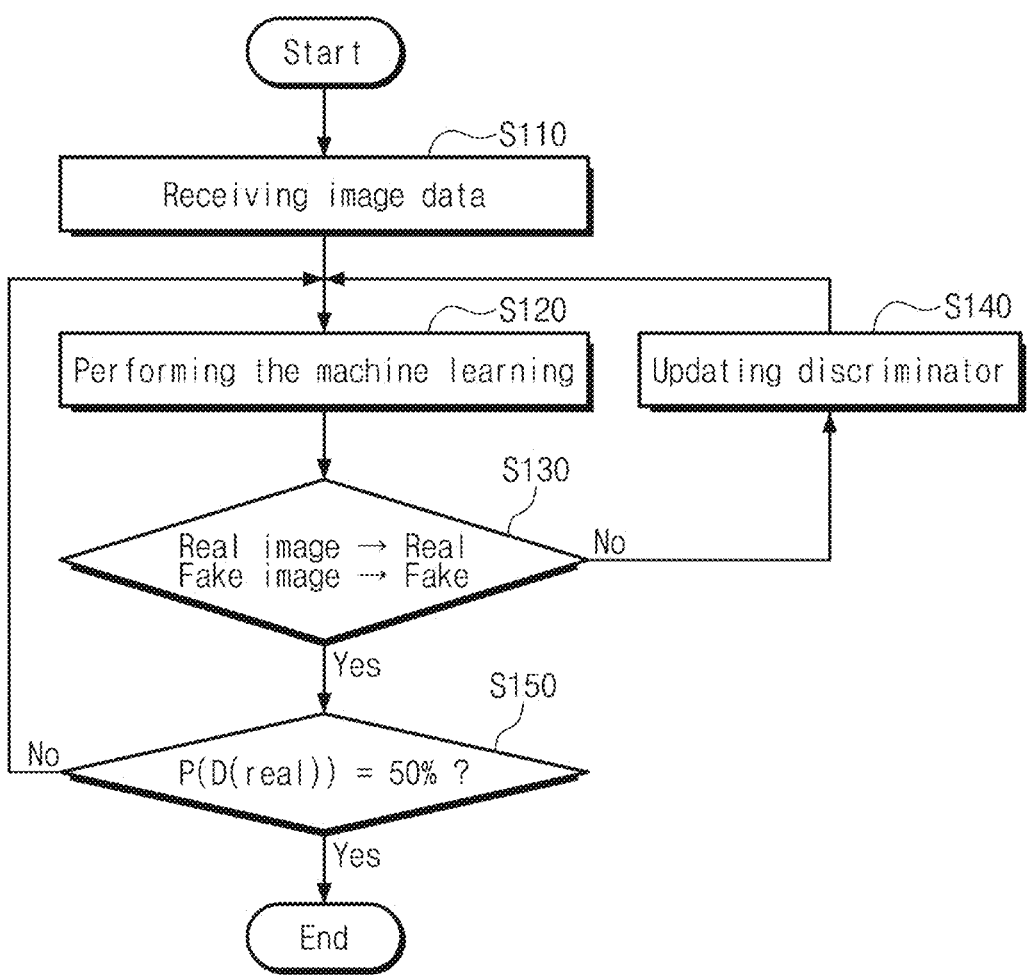
FIGS. 5A and 5B are flowcharts for describing a machine learning operation performed by a neuromorphic processor according to some embodiments.
Figure 5B:
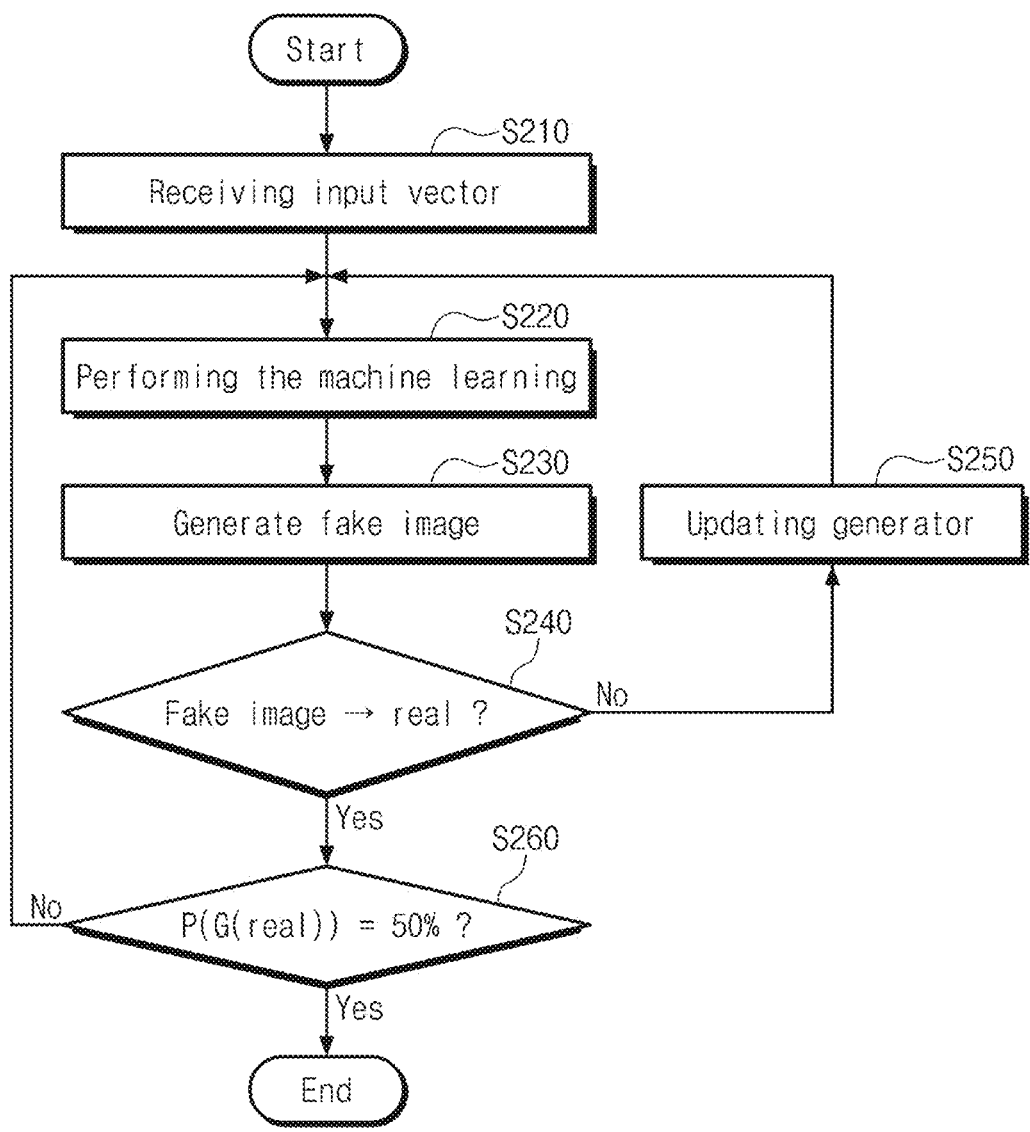

FIGS. 5A and 5B are flowcharts for describing a machine learning operation performed by the neuromorphic processor 230 (refer to FIG. 2) according to some embodiments. FIG. 5A is a flowchart for describing an example machine learning operation that the discriminator network 232 (refer to FIGS. 3 and/or 4) performs, and FIG. 5B is a flowchart for describing an example machine learning operation that the generator network 231 (refer to FIGS. 3 and/or 4) performs. For convenience of description, an example machine learning operation of the discriminator network 232 to be described with reference to FIG. 5A may be referred to as "first machine learning," and an example machine learning operation of the generator network 231 to be described with reference to FIG. 5B may be referred to as "second machine learning."

Referring to FIG. 5A, in operation S110, the discriminator network 232 may receive image data. The image data may include a real combination image corresponding to a combination of an SEM image and a CAD image, a fake combination image generated from the generator network 231, and/or a defect image capable of occurring at circuit patterns on a wafer in general.

In operation S120, the discriminator network 232 may perform the first machine learning. The first machine learning may be performed to determine whether data input to the discriminator network 232 is real or fake. The discriminator network 232 may perform the first machine learning through various operations of a plurality of convolution layers and a plurality of pooling layers. The operations of the plurality of convolution layers and the plurality of pooling layers will be more fully described with reference to FIG. 6.

In operation S130, the discriminator network 232 may determine whether an input image is real or fake. Though operation S120 and operation S130 are illustrated as separate steps this is for convenience of description; and in some example embodiments the determination of whether the input image is real or fake may be determined by the machine learning of operation S120 and/or may be determined based on a result of the machine learning of operation S120. The procedure proceeds to operation S140 in the following cases: where a real combination image input to the discriminator network 232 is determined by the discriminator network 232 as fake even though the real combination image is input to the discriminator network 232 and/or where a fake combination image input to the discriminator network 232 is determined by the discriminator network 232 as real even though the fake combination image is input to the discriminator network 232. Meanwhile, the procedure proceeds to operation S150 in the following cases: where a real combination image is input to the discriminator network 232 and is determined by the discriminator network 232 as real and/or where a fake combination image is input to the discriminator network 232 and is determined by the discriminator network 232 as fake.

In operation S140, the discriminator network 232 may update and/or tune weights and/or biases of the nodes included in the discriminator network 232, based on a determination result in operation S130. After the weights and/or biases of the discriminator network 232 are updated and/or tuned, the procedure proceeds to operation S120 to repeatedly perform the first machine learning.

In operation S150, the discriminator network 232 may determine whether the probability that a real combination image is determined as real converges to about 50%. When the probability that a real combination image is determined as real and a fake combination image is determined as fake converges to about 50%, the procedure for the first machine learning may be terminated. Meanwhile, when the probability that a real combination image is determined as real and a fake combination image is determined as fake does not converge to about 50%, the discriminator network 232 may return to operation S120 to repeatedly perform the first machine learning.

Referring to FIG. 5B, in operation S210, the generator network 231 may receive an input vector. The generator network 231 may generate a fake combination image based on the input vector. In some embodiments, the input vector may be distributed depending on a Gaussian distribution.

In operation S220, the generator network 231 may perform the second machine learning such that a fake combination image generated by the generator network 231 is determined by the discriminator network 232 as real. For example, the generator network 231 may generate a fake combination image based on a false positive and/or a false negative result of the discriminator network 232. The generator network 231 may perform the second machine learning through various operations of a plurality of deconvolution layers and a plurality of unpooling layers. The operations of the plurality of deconvolution layers and the plurality of unpooling layers will be more fully described with reference to FIG. 7.

In operation S230, the generator network 231 may generate a fake combination image based on the second machine learning. Though operation S220 and operation S230 are illustrated as separate steps, this is for convenience of description; and in some example embodiments, the machine learning of operation S220 may generate the fake image and/or the fake image may be generated based on a result of the machine learning of operation S220. The fake combination image thus generated may include pieces of information about defects capable of occurring at circuit patterns on a wafer, and the fake combination image may be transferred to the discriminator network 232 and/or may be output to the outside as output data.

In operation S240, the generator network 231 may receive an indication of whether the discriminator network 232 determined the fake combination image as a real combination image or fake combination image. When the discriminator network 232 determines the fake combination image as fake, the procedure proceeds to operation S250. When the discriminator network 232 determines the fake combination image as real, the procedure proceeds to operation S260.

In operation S250, the generator network 231 may update and/or tune weights and/or biases of the nodes included in the generator network 231, based on a determination result in operation S240. After the weights and/or biases of the generator network 231 are updated and/or tuned, the procedure proceeds to operation S220 to repeatedly perform the second machine learning.

In operation S260, the generator network 231 may determine whether the probability that a fake combination image is determined as real converges to about 50%. When the probability that a fake combination image is determined as real converges to about 50%, the procedure for the second machine learning may be terminated. Meanwhile, when the probability that a fake combination image is determined as real does not converge to about 50%, the generator network 231 may return to operation S220 to repeatedly perform the second machine learning.

Figure 6:
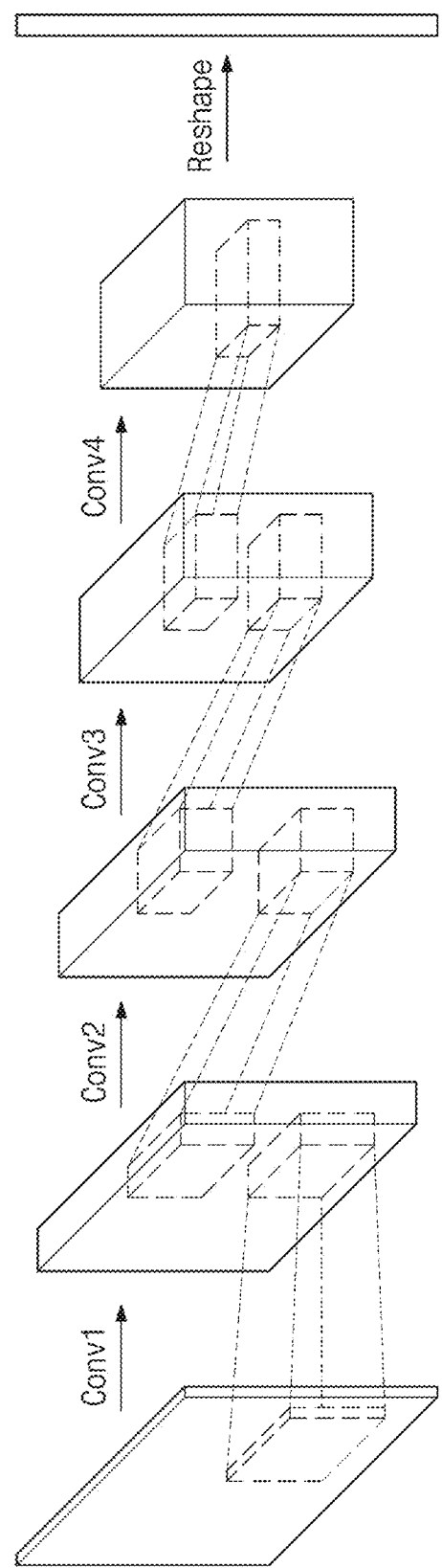
FIG. 6 is a diagram for describing how a discriminator network included in an image generation model executable by a neuromorphic processor, according to some embodiments, operates.

FIG. 6 is a diagram for describing how the discriminator network 232 (refer to FIG. 3 or 4) included in an image generation model executable by the neuromorphic processor 230, according to some embodiments, operates. The neuromorphic processor 230 may input a real combination image and/or a fake combination image to the discriminator network 232. A size of the combination image may be gradually reduced as the combination image passing through a plurality of layers. For example, an operation of the discriminator network 232 may be similar to and/or the same as an operation of a convolutional neural network (CNN). The discriminator network 232 may extract a feature of the combination image to determine whether the combination image is real or fake.

The discriminator network 232 may generate a feature image by applying a filter (or a kernel or a matrix) to the combination image and repeatedly performing convolution operations on sampling values of the combination image corresponding to the filter and/or values of the filter. The discriminator network 232 may scale down a size (and/or a dimension) of the feature image by repeatedly performing an average pooling operation and/or a maximum pooling operation on the feature image output from the convolution layer, to which the combination image is input, through a pooling layer. Polling may be referred as "down-sampling."

The combination image may pass through a plurality of convolution layers and a plurality of pooling layers included in the discriminator network 232 under control of the neuromorphic processor 230, and the number of layers is not limited to the example illustrated in FIG. 6. One convolution layer and one pooling layer may be collectively regarded as one convolution/pooling layer. In some embodiments, a condition "C" (refer to FIG. 4) may be applied to one of the layers. For example, the condition "C" may be applied to a convolution layer, a pooling layer, and/or a convolution/pooling layer.

The discriminator network 232 may reshape and/or transform a size of output data (or a feature image) passing through the plurality of convolution layers and the plurality of pooling layers. The reshaping of the output data may be omitted if unnecessary. The discriminator network 232 may perform the activation operation on the output data passing through the plurality of convolution layers and the plurality of pooling layers and may output a signal indicating whether the combination image is real or fake.

Figure 7:
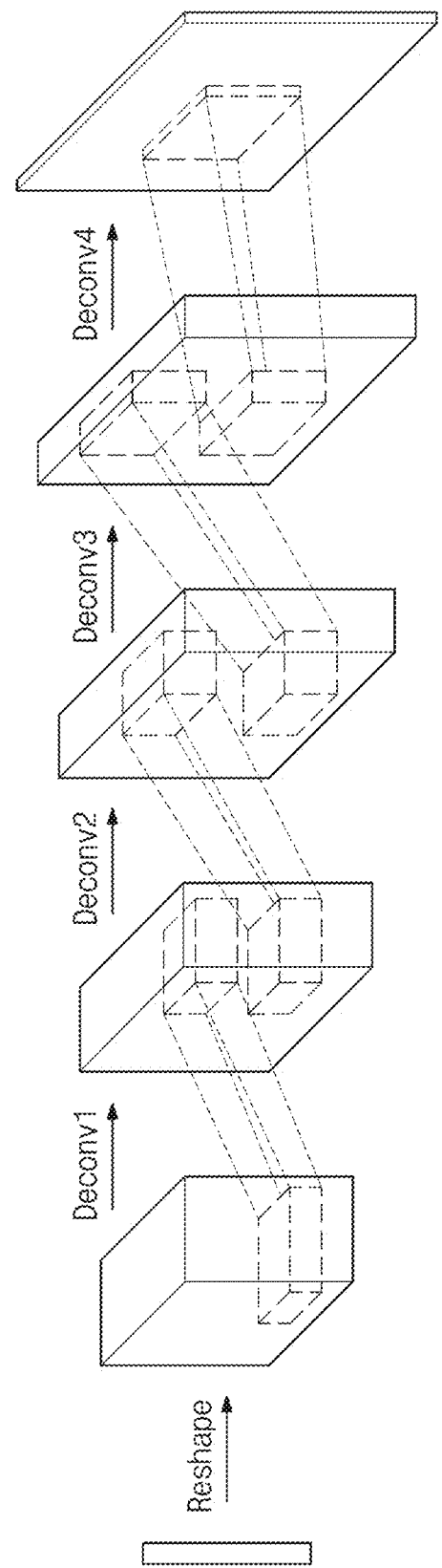
FIG. 7 is a diagram for describing how a generator network included in an image generation model executable by a neuromorphic processor, according to some embodiments, operates.

FIG. 7 is a diagram for describing how the generator network 231 (refer to FIGS. 3 and/or 4) included in the image generation model executable by the neuromorphic processor 230 according to some embodiments operate. The neuromorphic processor 230 may input an input vector to the generator network 231. A size (and/or dimension) of the input vector may be gradually enlarged (and/or expanded) as the input vector passes through a plurality of layers of the generator network 231. The generator network 231 may correspond to forward propagation, and the discriminator network 232 (refer to FIG. 3 or 4) may correspond to backward propagation. For example, an operation of the generator network 231 may be similar to an operation of a deconvolution neural network.

The neuromorphic processor 230 may reshape and/or transform the size (and/or dimension) of the input vector for the purpose of inputting the input vector to a layer of the generator network 231. The reshaping of the output vector may be omitted if unnecessary. The generator network 231 may enlarge the size of the input vector by repeatedly performing an unpooling operation on the input vector. Unpooling may be referred as "up-sampling." The generator network 231 may generate a feature image by repeatedly performing the deconvolution operation (and/or a transposed convolution operation) (marked by Deconv1, Deconv2, Deconv3, and Deconv4 in FIG. 7) on data output from an unpooling layer. The input vector may pass through a plurality of unpooling layers and a plurality of deconvolution layers included in the generator network 231 under the control of the neuromorphic processor 230, and the number of layers is not limited to the example illustrated in FIG. 7. One unpooling layer and one deconvolution layer may be collectively regarded as one unpooling/deconvolution layer. The generator network 231 may output a combination image by allowing the input vector to pass through a plurality of unpooling layers and a plurality of deconvolution layers.

Figure 8:
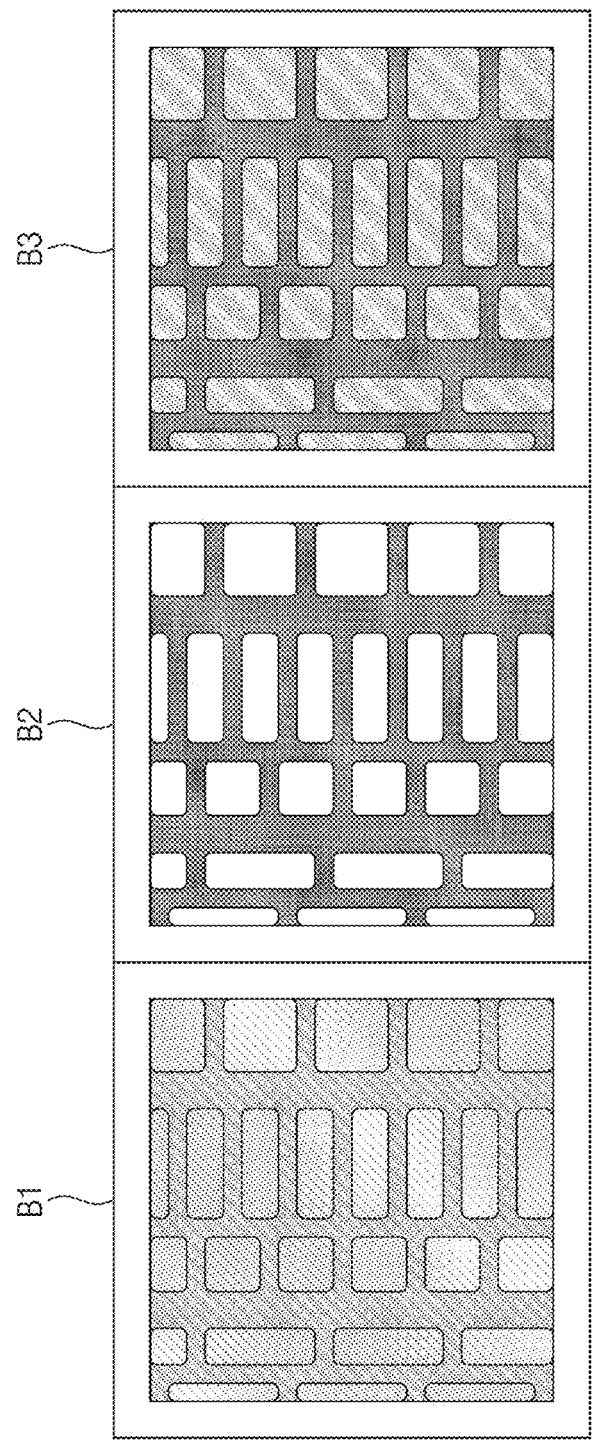
FIG. 8 is a diagram illustrating a combination image used in a wafer defect inference system according to some embodiments.

FIG. 8 is a diagram illustrating a combination image B3 used in the wafer defect inference system 10 according to some embodiments. According to some embodiments, the combination image B3 may be generated by overlapping an SEM image B1 and a CAD image B2 around a pattern axis (not illustrated). The SEM image B1 may include an image obtained by scanning circuit patterns formed on a wafer using a scanning electron microscope (SEM). The CAD image B2 may include a layout image of a mask for imprinting circuit patterns on a wafer.

The test equipment 100 (refer to FIG. 1) included in the wafer defect inference system 10 may be provided with the SEM image B1 and the CAD image B2. The test equipment 100 may overlap the SEM image B1 and the CAD image B2 to generate the combination image B3. Before overlapping the SEM image B1 and the CAD image B2, the test equipment 100 may perform an alignment operation for performing template matching. The computing device 200 (refer to FIG. 1) may be provided with the combination image B3 from the test equipment 100. The wafer defect inference system 10 according to the present disclosure may perform machine learning of the generator network 231 (refer to FIGS. 3 and/or 4) and the discriminator network 232 (refer to FIGS. 3 and/or 4) based on the combination image B3. The wafer defect inference system 10 may extract various types of defect information, such as a kind of a defect on a wafer, a size of the defect, a color of the defect, a location of the defect, and/or a shape of the defect, as well as a location of the defect. The computing device 200 of the wafer defect inference system 10 may draw defect information from the combination image B3 being input data, based on the machine learning.

Figure 9:
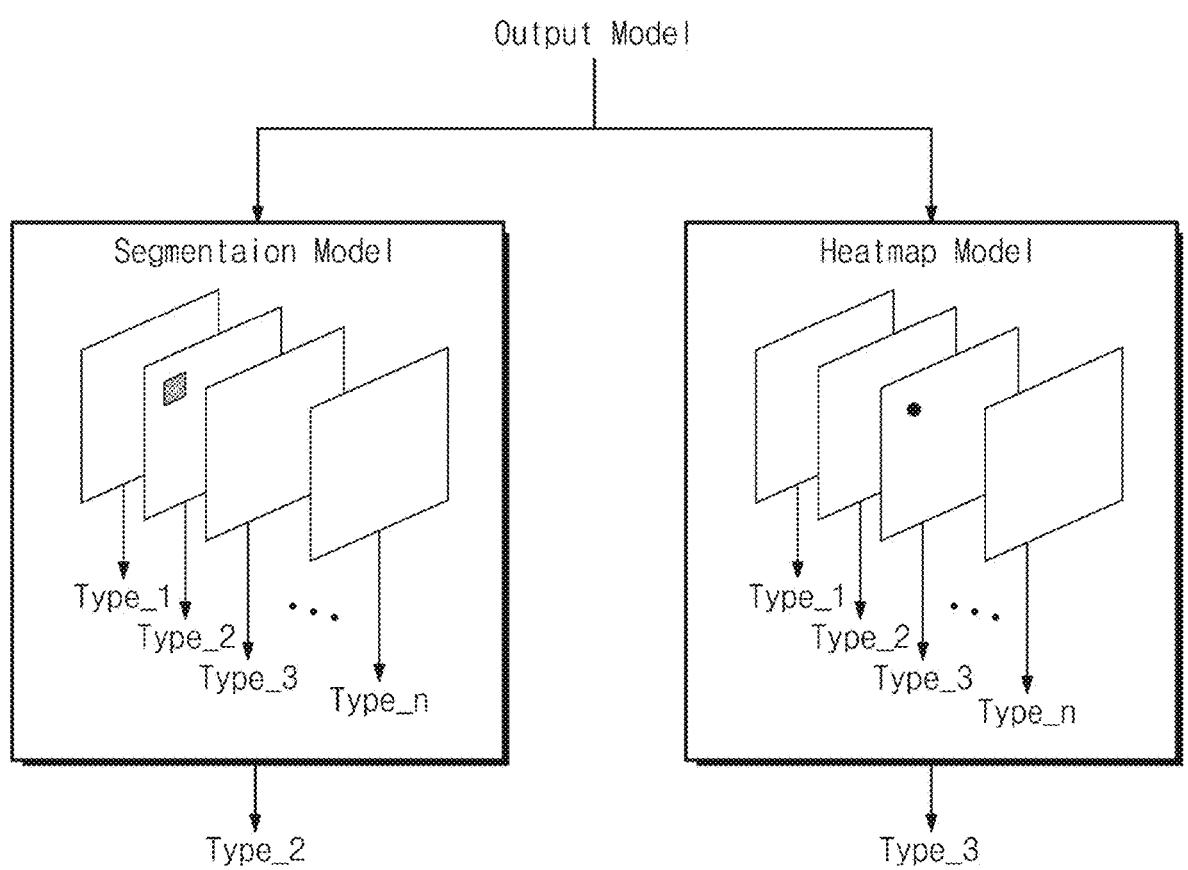
FIG. 9 is a diagram for describing an output data model of a wafer defect inference system according to some embodiments.

FIG. 9 is a diagram for describing an output data model of the wafer defect inference system 10 according to some embodiments. In addition to the classification of a defect location, the wafer defect inference system 10 according to some embodiments may accurately infer various types of defect information such as a location of a defect, a size of the defect, a shape of the defect, a color of the defect, and/or a kind of the defect. Accordingly, the wafer defect inference system 10 may use a segmentation model and/or a heat map model as an output data model.

For example, in some embodiments, the wafer defect inference system 10 may generate an image indicating a defect of circuit patterns on a wafer based on the segmentation model. The segmentation model may be a model predicting a class to which each pixel of the image belongs, and the prediction may be made on all the pixels of the image. The segmentation model may be implemented with a gray scale model and/or a red, green, and blue (RGB) model displaying defect information. In some embodiments, the segmentation model implemented with the gray scale model may be a binary model. The segmentation model may generate a defect image segmented from a background in units of pixel, for example, as disclosed in FIG. 9. However, the segmentation model may infer a defect from specific channel information according to a type of the defect without a separate classification module. According to the segmentation model, as the number of layers included in the generator network 231 (refer to FIGS. 3 and/or 4) and the discriminator network 232 (refer to FIGS. 3 and/or 4) increases, the elaborateness of a defect inference image may increase.

In some embodiments wherein the segmentation model is used for the machine learning of the generator network 231 and the discriminator network 232, in the case where a combination image is not segmented in units of pixel, the reliability of a fake combination image generated by the generator network 231 may decrease. Accordingly, in the case where the wafer defect inference system 10 is driven based on the segmentation model, to make the reliability of output data high, the wafer defect inference system 10 may refine conventional defect images and may use a segmentation image associated with a defect portion as learning data. A size of the segmentation image may be at least a size of a pixel of a combination image.

In some embodiments the wafer defect inference system 10 may generate an image indicating a defect of circuit patterns on a wafer based on the heat map model. The generator network 231 may generate an output image indicating a defect of circuit patterns on a wafer, in a manner similar to that of the segmentation model. The heat map model may, instead of segmenting an image in units of pixel, perform defect prediction based on a Gaussian distribution. Also, the heat map model may infer a defect from specific channel information according to a type of the defect without a separate classification module. Even in the heat map model, as the number of layers included in the generator network 231 (refer to FIGS. 3 and/or 4) and the discriminator network 232 (refer to FIGS. 3 and/or 4) increases, the elaborateness of a defect inference image may increase.

In the case where the heat map model is used in the learning of the generator network 231 and the discriminator network 232, the learning based on inaccurate defect information may be possible compared to the segmentation model. For example, even though a shape of a defect object included in conventional defect image is inaccurate or a shape of the defect object is not clear, a fake combination image of low accuracy may be prevented from being generated from the generator network 231 by using the heat map model. In the case of the heat map model, a fake combination image that makes it possible to infer a defect more accurately may be generated by calculating average locations of defects, generating a Gaussian heat map associated with the average locations, and performing learning based on the Gaussian heat map.

The wafer defect inference system 10 may generate an image based on one of the segmentation model and the heat map model. Also, the wafer defect inference system 10 according to the present disclosure may generate an image based on an ensemble model of the segmentation model and the heat map model. In the case where the wafer defect inference system 10 is driven based on the ensemble model, the accuracy of defect inference may be improved even more.

Figure 10A:
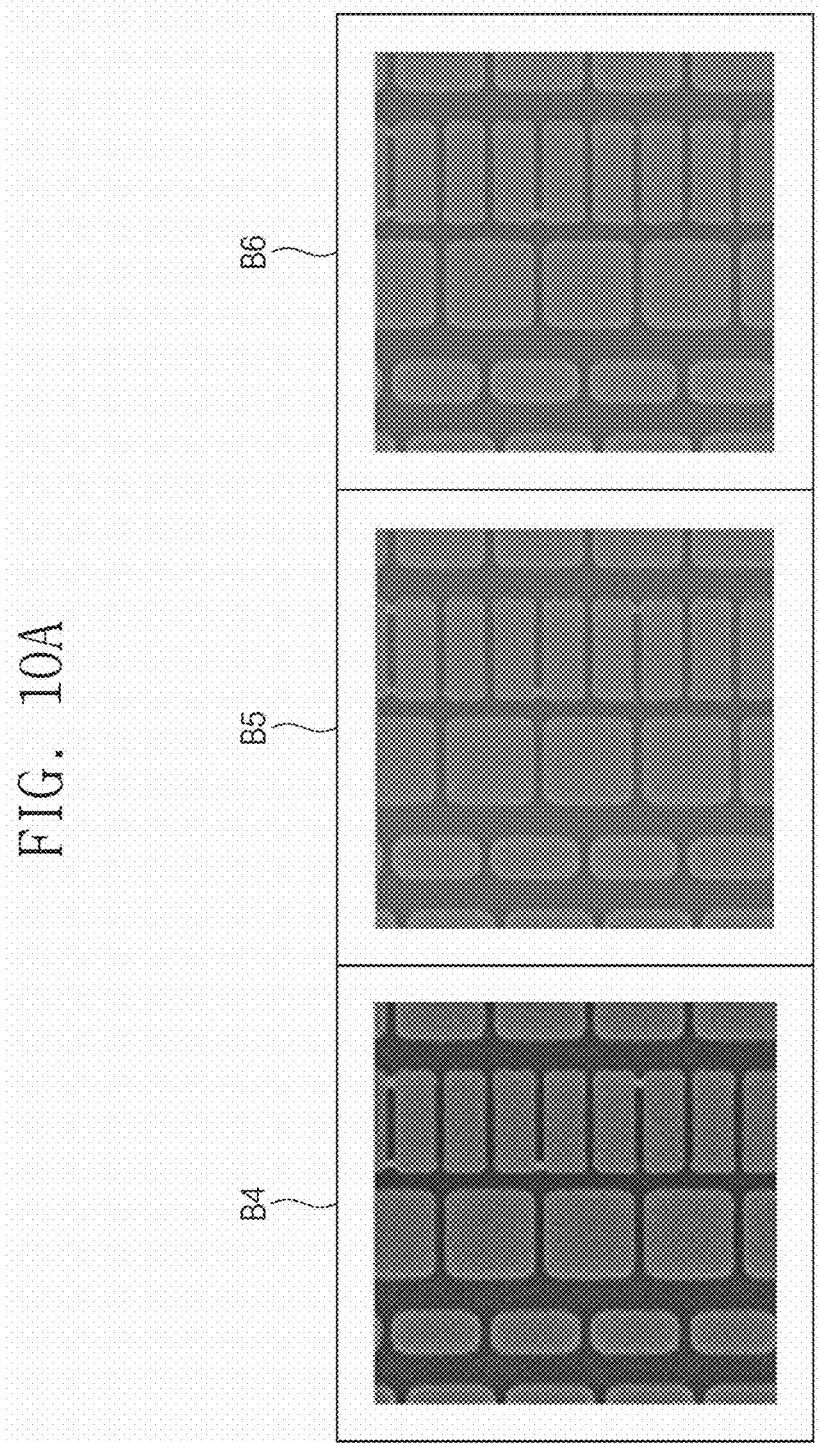
FIGS. 10A and 10B are diagrams indicating simulation results of a wafer defect inference system according to some embodiments.
Figure 10B:
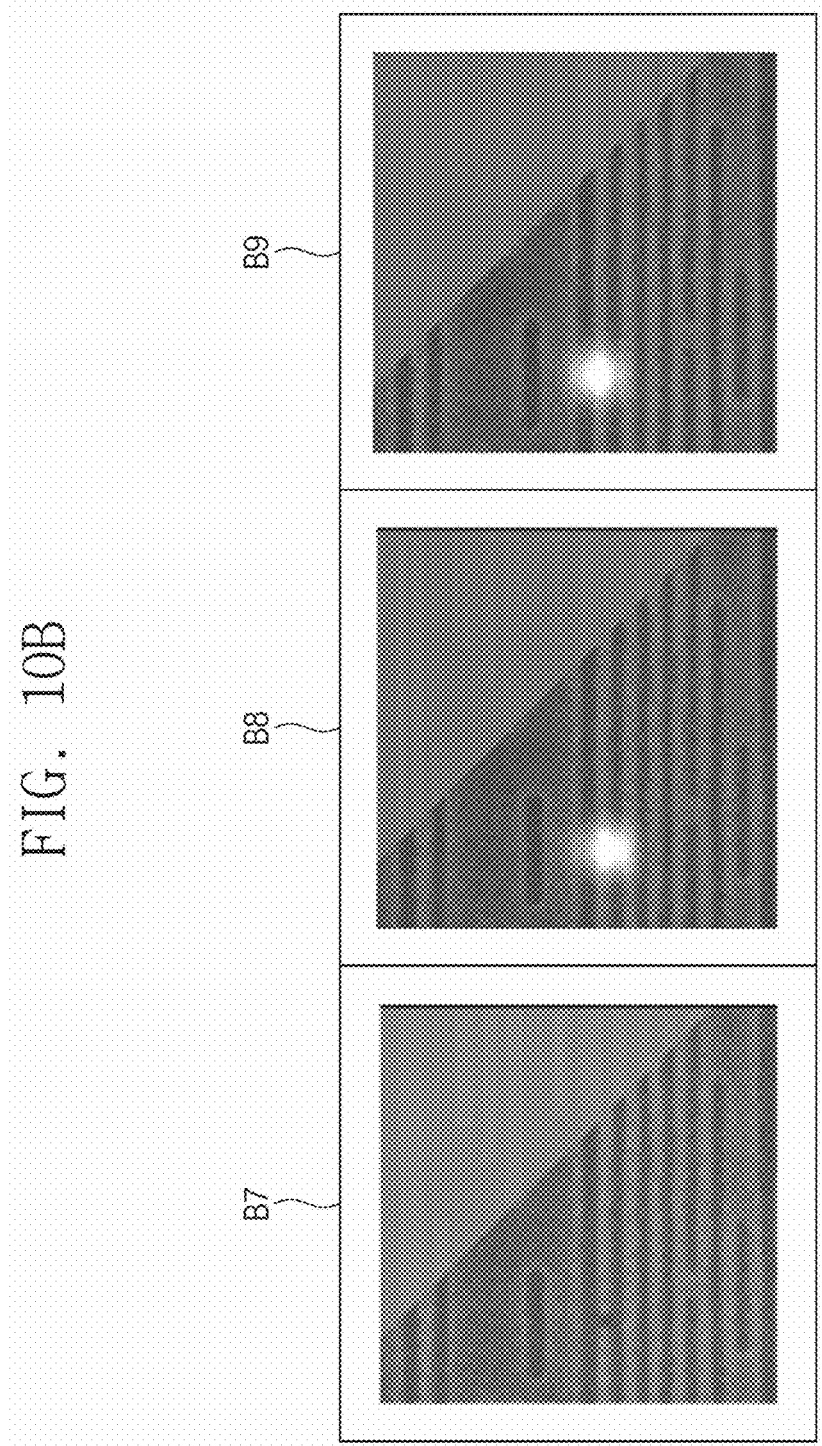

FIGS. 10A and 10B are diagrams indicating simulation results of the wafer defect inference system 10 (refer to FIG. 1) according to some embodiments. FIGS. 10A and 10B show input images B4 and B7, target images B5 and B8, and output images B6 and B9 as a simulation result of the wafer defect inference system 10. FIG. 10A shows a simulation image of the wafer defect inference system 10 based on the segmentation model, and FIG. 10B shows a simulation image of the wafer defect inference system 10 based on the heat map model.

In FIG. 10A, the input image B4 is a combination image that is obtained by combining an SEM image of a wafer targeted for defect detection and a CAD image of a mask used in a wafer process. The input image B4 may be input to the test equipment 100 (refer to FIG. 1) included in the wafer defect inference system 10 to be combined at the test equipment 100 and may be input to the computing device 200 (refer to FIG. 1) in the form of a combination image. Before combining the SEM image and the CAD image, the test equipment 100 may first perform the alignment operation for template matching.

The target image B5 means a target image to be drawn from the wafer defect inference system 10. The generator network 231 (refer to FIGS. 3 and/or 4) may generate the output image B6 similar to the target image B5, based on the first machine learning performed by the discriminator network 232 (refer to FIGS. 3 and/or 4) and the second machine learning performed by the generator network 231. The output image B6 may indicate various types of defect information such as a location of a defect on a wafer targeted for defect detection, a size of the defect, a shape of the defect, a color of the defect, and a kind of the defect. The reliability of the output image B6 may be proportional to the level of machine learning of the computing device 200 performed with regard to a defect and the number of layers included in the generator network 231 and the discriminator network 232 of the neuromorphic processor 230 (refer to FIG. 2) in the computing device 200.

In FIG. 10B, also, when the input image B7, corresponding to a combination image of the SEM image and the CAD image, is input to the computing device 200, the output image B9 may be generated based on the target image B8. Unlike the result of FIG. 10A based on the segmentation model, a result of FIG. 10B (e.g., the output image B9) may be generated based on the heat map model. Because the heat map model uses the Gaussian distribution associated with defect information, to infer a defect of circuit patterns on a wafer may be easy compared to the segmentation model of FIG. 10A.

Figure 11:
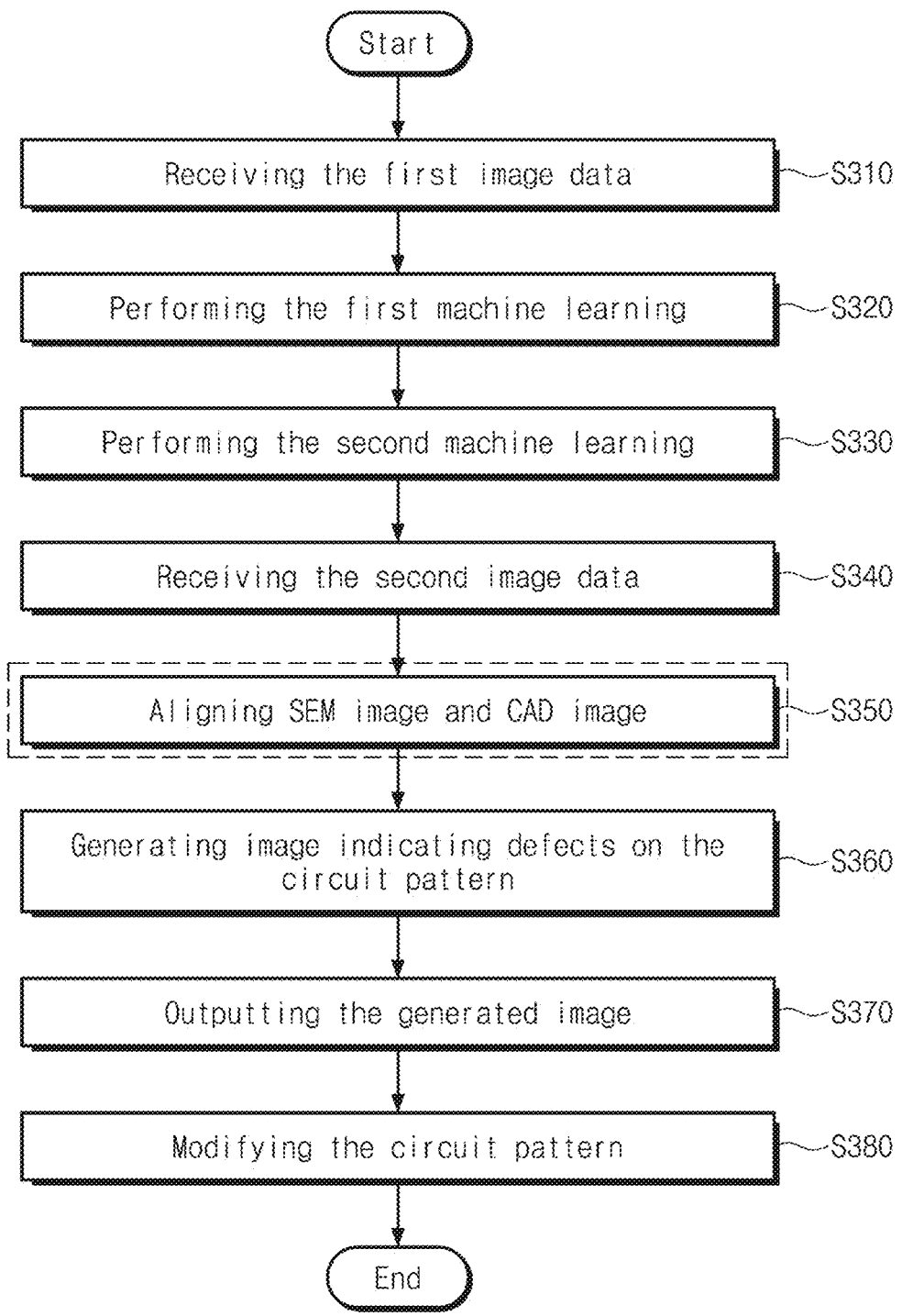
FIG. 11 is a flowchart for describing an operating method of a wafer defect inference system according to some embodiments.

FIG. 11 is a flowchart for describing an operating method of the wafer defect inference system 10 (refer to FIG. 1) according to some embodiments. In operation S310, the wafer defect inference system 10 may receive first image data. The first image data may include an SEM image and a CAD image or may include a conventional defect image for learning of defect information.

In operation S320, the wafer defect inference system 10 may perform the first machine learning. In this case, the first machine learning means learning for determining whether image data input to the discriminator network 232 (refer to FIGS. 3 and/or 4) is real or fake. The first machine learning of the discriminator network 232 is described with reference to FIG. 5A in detail.

In operation S330, the wafer defect inference system 10 may perform the second machine learning. In this case, the second machine learning means learning for determining image data generated by the generator network 231 (refer to FIGS. 3 and/or 4) as real. The second machine learning of the generator network 231 is described with reference to FIG. 5B in detail.

In operation S340, the wafer defect inference system 10 may receive second image data. The second image data may include a SEM image and a CAD image of a wafer targeted for defect detection. The SEM image and the CAD image input from the outside may be combined by the test equipment 100 (refer to FIG. 1).

In operation S350, the wafer defect inference system 10 may align the SEM image and the CAD image input in operation S340 around a pattern axis to perform template matching on the SEM image and the CAD image. The test equipment 100 may combine the SEM image and the CAD image aligned around the pattern axis to generate a combination image. However, in some embodiments, operation S350 may be omitted.

In operation S360, the wafer defect inference system 10 may generate an image including information about a defect existing in circuit patterns on a wafer being a check target, based on the combination image. The defect information may include a location of a defect, a size of the defect, a color of the defect, a kind of the defect, and/or the like.

In operation S370, the wafer defect inference system 10 may output the image generated in operation S360. The image including the defect information about the circuit pattern on the wafer may be visually transferred to the user through the user output interface. In some embodiments, the defect information may include an indication that the circuit pattern is to be reprocessed and/or discarded.

In operation S380, based on the defect information about the circuit pattern on the wafer the circuit pattern, wafer, and/or mask may be modified to address the inferred defect. For example, in some example embodiments, the circuit pattern and/or wafer may be reprocessed and/or discarded. For example, the circuit pattern and/or wafer may be reprocessed (e.g., in a case wherein the defect is fixable) and/or discarded based on the type and/or severity of the defect. In some embodiments, the mask associated with the circuit pattern may be modified to reduce the potential of the formation of an inferred defect. In some embodiments, operation S380 may be omitted.

According to the present disclosure, the probability that a defect occurs on a wafer may decrease by inferring various types of defect features such as a location of a defect on the wafer, a size of the defect, a shape of the defect, a color of the defect, a kind of the defect, and/or the like.

According to the present disclosure, because a new type of defect is inferred through machine learning without data including information about all types of defects, false detection and undetection capable of occurring in detecting a defect on a wafer may decrease.

While the present disclosure has been described with reference to some example embodiments thereof, it will be apparent to those of ordinary skill in the art that various changes and modifications may be made thereto without departing from the spirit and scope of the present disclosure as set forth in the following claims.

What is claimed is:

1. A wafer defect inference system comprising:
   a test equipment configured to receive a first image obtained by imaging circuit patterns formed on a semiconductor wafer by using a scanning electron microscope and a second image obtained by imaging a layout image of a mask for implementing the circuit patterns on the semiconductor wafer and to combine the first image and the second image to generate a combination image; and
   at least one computing device configured to communicate with the test equipment and configured to infer a defect associated with the circuit pattern formed on the semiconductor wafer based on the combination image,
   wherein the at least one computing device is configured to:
      receive the combination image;
      perform machine learning for inferring the defect based on the combination image; and
      generate an output image including information about the defect based on the machine learning,
   wherein the inferring the defect by performing the machine learning is based on an association between the defect in the circuit pattern and the layout image determined by the machine learning.

2. The wafer defect inference system of claim 1, wherein the machine learning is based on a generative adversarial network (GAN).

3. The wafer defect inference system of claim 1, wherein the machine learning is based on a conditional generative adversarial network (CGAN).

4. The wafer defect inference system of claim 1, wherein the test equipment generates the combination image by aligning the first image and the second image around a pattern axis and combining the first image and the second image.

5. The wafer defect inference system of claim 1, wherein the at least one computing device includes:
   at least one neuromorphic processor configured to perform the machine learning, to infer the defect, and to generate the output image;
   a processor configured to control the neuromorphic processor;
   a random access memory used as a working memory of the neuromorphic processor; and
   storage configured to store data generated by the processor.

6. The wafer defect inference system of claim 5, wherein the neuromorphic processor is configured to
   generate a fake combination image based on an input vector; and
   determine whether the combination image or the fake combination image is real or fake.

7. The wafer defect inference system of claim 6, wherein the neuromorphic processor is configured to
   perform a first machine learning for determining whether the combination image or the fake combination image is real or fake, and
   perform a second machine learning for generating the fake combination image for training of the first machine learning.

8. The wafer defect inference system of claim 1, wherein the at least one computing device generates the output image based on at least one of a segmentation model, a heat map model, or a combination model corresponding to a combination of the segmentation model and the heat map model.

9. The wafer defect inference system of claim 1, wherein the information about the defect includes at least one of a location of the defect, a size of the defect, a color of the defect, or a kind of the defect.

10. A method of inferring a defect in a circuit pattern formed on a semiconductor wafer, the method comprising:
   combining a first image and a second image to generate a combination image by overlapping the first image and the second image around a pattern axis, the first image including an imaging of the circuit pattern, and the second image including an imaging of a layout image of a mask for implementing the circuit pattern on the semiconductor wafer;
   generating, based on a machine learning operation of at least one computing device, an output image from the combination image, the output image including defect information about the defect; and
   outputting the output image,
   wherein the generating the output image includes inferring, by the machine learning operation, the defect based on an association between the defect in the circuit pattern and the layout image.

11. The method of claim 10, wherein the machine learning operation is based on a generative adversarial network (GAN).

12. The method of claim 10, wherein the machine learning operation is based on a conditional generative adversarial network (CGAN).

13. The method of claim 10, wherein the machine learning includes a first machine learning and a second machine learning,
   the first machine learning is performed by a discriminator network to determine whether an input image is real or fake, and
   the second machine learning is performed by a generator network to generate a fake combination image which is determined as real by the discriminator network.

14. The method of claim 10, wherein the output image is generated based on at least one of a segmentation model, a heat map model, or a combination model corresponding to a combination of the segmentation model and the heat map model.

15. The method of claim 10, wherein the defect information includes at least one of a location of the defect, a size of the defect, a color of the defect, or a kind of the defect.

16. A non-transitory computer-readable medium storing a program code including an image generation model executable by a processor, the program code, when executed, causing the processor to:
   combine a first image and a second image to generate a combination image, the first image including an imaging of a circuit pattern formed on a semiconductor wafer, and the second image including an imaging of a layout image of a mask for implementing the circuit pattern on the semiconductor wafer; and
   generate, based on machine learning, an output image from the combination image, the output image including defect information of the circuit pattern, wherein the generating the output image includes inferring, by the machine learning, the defect based on an association between the defect in the circuit pattern and the layout image.

17. The non-transitory computer-readable medium of claim 16, wherein the machine learning is based on a generative adversarial network (GAN).

18. The non-transitory computer-readable medium of claim 16, wherein the machine learning is based on a conditional generative adversarial network (CGAN).

19. The non-transitory computer-readable medium of claim 16, wherein the output image is generated based on at least one of a segmentation model, a heat map model, or a combination model corresponding to a combination of the segmentation model and the heat map model.

* * * * *